(12) United States Patent
Bastesen et al.

(10) Patent No.: US 7,402,000 B2
(45) Date of Patent: Jul. 22, 2008

(54) SPOOL PIECE TERMINATION STRUCTURE, A CONNECTION ARRANGEMENT COMPRISING SUCH A TERMINATION STRUCTURE AND A PIPELINE TERMINATION

(75) Inventors: Rolf Bastesen, Nesoddtangen (NO); Helge Ingebretsen, Svelvik (NO); Fredrik Witting, Hagen (NO)

(73) Assignee: Vetco Gray Scandinavia AS, Billingstad (NO)

( * ) Notice: Subject to any disclaimer, the term of this patent is extended or adjusted under 35 U.S.C. 154(b) by 225 days.

(21) Appl. No.: 10/558,272

(22) PCT Filed: May 28, 2004

(86) PCT No.: PCT/IB2004/001762

§ 371 (c)(1),
(2), (4) Date: Nov. 28, 2005

(87) PCT Pub. No.: WO2004/106696

PCT Pub. Date: Dec. 9, 2004

(65) Prior Publication Data

US 2007/0009328 A1    Jan. 11, 2007

Related U.S. Application Data

(60) Provisional application No. 60/473,448, filed on May 28, 2003.

(51) Int. Cl.
*F16L 1/26* (2006.01)
*E21B 21/04* (2006.01)

(52) U.S. Cl. ............... 405/170; 29/781; 414/745.4; 166/342; 166/344; 285/24; 285/920

(58) Field of Classification Search .......... 405/169, 405/170; 29/781; 414/745.4
See application file for complete search history.

(56) References Cited

U.S. PATENT DOCUMENTS

| 3,204,417 | A | * | 9/1965 | Robley | 405/170 |
| 3,267,682 | A | * | 8/1966 | Robley | 405/170 |
| 4,019,334 | A | | 4/1977 | Sinclair et al. | 405/169 |
| 4,028,903 | A | * | 6/1977 | Dietrich | 405/170 |
| 4,076,130 | A | * | 2/1978 | Sumner | 405/170 |
| 4,218,158 | A | * | 8/1980 | Tesson | 405/170 |
| 4,832,530 | A | * | 5/1989 | Andersen et al. | 405/170 |
| 5,433,482 | A | | 7/1995 | Baddour | 285/31 |
| 5,458,440 | A | | 10/1995 | Van Helvoirt | 405/169 |

(Continued)

FOREIGN PATENT DOCUMENTS

EP    0733843  A1    9/1996

(Continued)

*Primary Examiner*—Tara L. Mayo
(74) *Attorney, Agent, or Firm*—Venable LLP; Eric J. Franklin (57) ABSTRACT

A spool piece termination structure to be mounted to a spool piece so as to support a spool piece hub during the connection of the spool piece hub to a corresponding pipeline hub. The termination structure includes a clamping device for clamping together the spool piece hub and pipeline hub, and a base frame openly shaped downwards so as to allow the termination structure to receive a pipeline end section provided with the pipeline hub by lowering the termination structure downwards onto the pipeline end section. A connection arrangement includes such a spool piece termination structure and a method for subsea connection of a pipeline to a spool piece.

23 Claims, 8 Drawing Sheets

U.S. PATENT DOCUMENTS 5,730,551 A * 3/1998 Skeels et al. ................ 405/170
6,142,708 A 11/2000 Tarlton et al. ............... 405/170
6,742,963 B2 * 6/2004 Bekkevold et al. .......... 405/170
6,997,645 B2 * 2/2006 von Trepka et al. ......... 405/170
2003/0049076 A1 * 3/2003 Bekkevold et al. .......... 405/170

FOREIGN PATENT DOCUMENTS

GB 2323907 A 10/1998

* cited by examiner

SPOOL PIECE TERMINATION STRUCTURE, A CONNECTION ARRANGEMENT COMPRISING SUCH A TERMINATION STRUCTURE AND A PIPELINE TERMINATION

CROSS-REFERENCE TO RELATED APPLICATIONS

This application is a national phase application of PCT/IB2004/001762 filed 28 May 2004 and claims priority from U.S. provisional patent application 60/473,448, filed 28 May 2003.

FIELD OF THE INVENTION AND PRIOR ART

The present invention relates to spool piece termination structure and a connection arrangement for subsea connection of a pipeline to a spool piece comprising such a termination structure. The invention also relates to a method for subsea connection of a pipeline to a spool piece. The invention also relates to a pipeline termination.

Development within offshore oil and gas exploration in the recent years has been directed to subsea installations for processing and transport of oil and gas. These subsea installations replace the traditional platforms, where oil and gas was transported up to the platform for further processing and transport. This development of subsea production, processing and transport systems has resulted in an increasing need for subsea connection arrangements for coupling together a longer pipeline installed on the seabed and a so-called spool piece without requiring any assistance of divers. A spool piece is used for connecting a pipeline termination to a pipe termination of a subsea installation, such as e.g. a subsea production or injection well. The spool piece is designed to span between the end points of the pipeline termination and said pipe termination in order to complete a connection between the pipeline and said pipe. The spool piece is provided with a spool piece hub which is to mate with a corresponding pipeline hub arranged at the pipeline termination.

A pipeline connection arrangement and method for subsea connection of a pipeline to a spool piece is previously known from U.S. Pat. No. 4,019,334 A. The spool piece hub is here attached to a foundation arranged on the seabed. The pipeline hub is secured to a trunnion assembly and is installed on the subsea foundation by being lowered together with the trunnion assembly downwards from a surface vessel guided by a guide cable. After the pipeline hub and the trunnion assembly have been landed on the subsea foundation and secured thereto, a remotely operated connecting tool is lowered downwards from the surface vessel and is operated to displace the spool piece hub into engagement with the pipeline hub, whereupon the connecting tool is operated to actuate a clamping device so as to clamp together the spool piece hub and the pipeline hub. The connecting tool is then retrieved to the surface vessel. This known connection arrangement and method require that the spool piece and the subsea foundation are installed on the seabed before the pipeline is laid out on the seabed and the pipeline end section provided with the pipeline hub has to be secured to the subsea foundation before the remaining part of the pipeline is laid out on the seabed. Consequently, this known connection arrangement and method are not appropriate for use when connecting a spool piece to a pipeline that has previously been laid on the seabed.

Another pipeline connection arrangement for subsea connection of a pipeline to a spool piece is previously known from U.S. Pat. No. 6,142,708 A. The pipeline hub is here secured to a landing platform, which is to be lowered onto the seabed from a surface vessel. The spool piece hub is secured to a connecting tool, which is lowered downwards onto the landing platform so as to come to rest thereon, whereupon the connecting tool is operated to displace the spool piece hub into engagement with the pipeline hub. The pipeline hub is secured to the rather complex and bulky landing platform before being lowered into the sea from a surface vessel. The lay ramp and other equipment of the pipe-laying vessel have to be adapted and dimensioned for enabling manipulation and lay out of the landing platform. This will raise the costs for the pipe-laying vessel and reduce the number of vessels available for the pipe-laying operation, which could cause high costs for performing the pipe-laying operation.

SUMMARY OF THE INVENTION

The object of the present invention is to make possible subsea connection of a pipeline to a spool piece, without requiring any complex and/or bulky equipment to be attached to the pipeline hub before it is descended into the sea from a surface vessel.

According to the invention, this object is achieved by a spool piece termination structure, a connection arrangement and a method according to the present invention.

The spool piece termination structure according to the invention comprises a base frame, which is openly shaped downwards so as to allow the termination structure to receive a pipeline end section provided with a pipeline hub by lowering the termination structure downwards onto said pipeline end section. After the receipt of the pipeline end section in the termination structure, the actual connection of the pipeline hub to the spool piece hub may be performed by displacing the pipeline hub and the spool piece hub with the clamping device in relation to each other so as to bring the pipeline hub and the spool piece hub into contact with each other, whereupon the clamping device is activated so as to clamp together the pipeline hub and the spool piece hub. Consequently, the initial connection between the pipeline hub and the spool piece termination structure is accomplished by lowering the termination structure downwards onto the pipeline hub. Thus, the entire pipeline may be laid on the seabed before the measures of connecting the pipeline to the spool piece are initiated. With the solution according to the invention, no landing platform or similar structure has to be secured to the pipeline end section when it is descended from the pipe-laying vessel, which will facilitate the pipe-laying operation and allow the pipeline to be laid out by means of a conventional pipe-laying vessel. Thus, the inventive solution will reduce the demands on the pipe-laying vessel with respect to its equipment as compared to the prior art solutions where a landing platform or the similar is secured to the pipeline before it leaves the pipe-laying vessel.

According to a preferred embodiment of the connection arrangement according to the invention, the alignment structure is designed to receive at least a part of a rotationally symmetric flange of a pipeline end section. Hereby, the alignment structure may receive the pipeline end section flange irrespective of the roll angle of the pipeline end section and the associated pipeline hub. Consequently, the roll angle of the pipeline end section and the associated pipeline hub is of no importance during the installation of the pipeline on the seabed and during the subsequent operations for connecting the pipeline hub to the spool piece hub. Thus, the pipeline end section and the associated pipeline hub may be laid on the seabed with arbitrary roll angle, which will facilitate the pipe-laying operation.

According to another preferred embodiment of the connection arrangement according to the invention, the termination structure and alignment structure are provided with corresponding alignment members which are designed to come into contact with each other when the alignment structure and clamping device are displaced towards each other so as to reduce the angle between the hub mating faces. Hereby, the pipeline hub will automatically be sufficiently aligned with the spool piece hub to meet the closing capture range of the clamping device when they have been displaced towards each other.

According to another preferred embodiment of the connection arrangement according to the invention, one of the alignment structure and termination structure is provided with at least one male-like alignment member, preferably in the form of a spear, which is designed to fit into a corresponding female-like alignment member, preferably in the form of a spear funnel, arranged on the other of said structures. This will provide a co-axial alignment so as to allow the mutual alignment shoulder/recess arrangement of the hubs perform the final alignment and load transfer. The respective male-like alignment member is preferably displaceably mounted in the associated structure so as to allow the alignment member to be retracted out of the corresponding female-like alignment member without having to displace the entire alignment structure in relation to the termination structure. This will facilitate the retrieval to the surface of the alignment structure after the completion of the connection between the pipeline hub and the spool piece hub.

Further advantages as well as advantageous features of the spool piece termination structure, the connection arrangement and the method according to the present invention will appear from the following description.

The invention also relates to a pipeline termination. The design of the pipeline termination with a flange located behind the pipeline hub will allow the pipeline termination to be manipulated sub-sea during the operations for connecting the pipeline hub to a corresponding spool piece hub, without requiring any complex and/or bulky equipment to be attached to the pipeline termination before it is descended into the sea from a surface vessel.

According to a preferred embodiment of the pipeline termination according to the invention, said flange is rotationally symmetric. Hereby, the roll angle of the pipeline termination is of no importance during the installation of the pipeline on the seabed and during the subsequent operations for connecting the pipeline hub to the spool piece hub. Thus, the pipeline termination may be laid on the seabed with arbitrary roll angle, which will facilitate the pipe-laying operation.

BRIEF DESCRIPTION OF THE DRAWINGS

With reference to the appended drawings, a specific description of preferred embodiments of the invention cited as examples follows below.

In the drawings.

DETAILED DESCRIPTION OF PREFERRED EMBODIMENTS OF THE INVENTION

Figure 1:
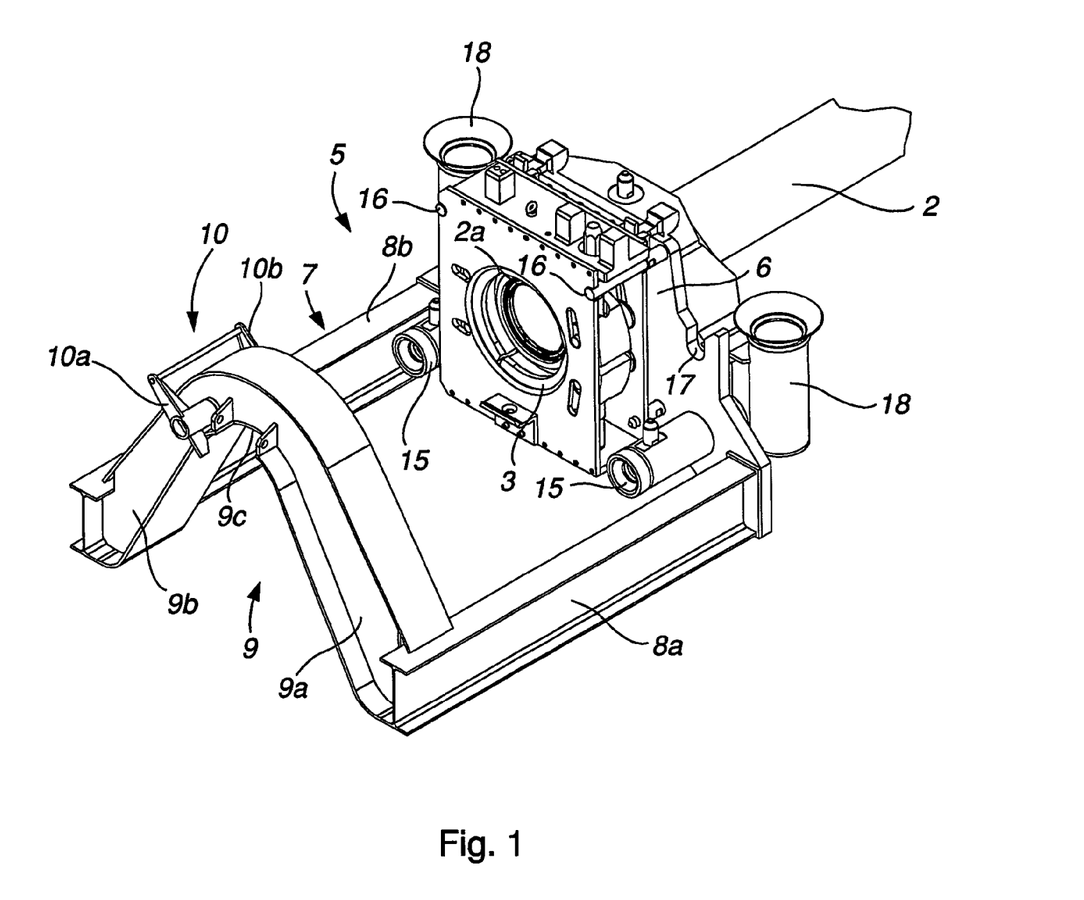
FIG. 1 is a perspective view of a spool piece termination structure according to a first embodiment of the invention.

A spool piece termination structure 5 according to a first embodiment of the present invention is shown in FIG. 1. The termination structure 5 is intended for use in subsea connection of a pipeline 1 (see FIGS. 5-7) to a spool piece 2 and comprises a clamping device 3 for clamping together a pipeline hub 1a (see FIGS. 5-7) secured to the end of the pipeline and a corresponding spool piece hub 2a secured to the end of the spool piece. The spool piece hub 2a and the associated spool piece 2 are to be mounted to the termination structure 5 before being lowered into the sea from a surface vessel. Thus, the spool piece hub and the spool piece are mounted to the termination structure before the performance of a connecting operation. In the illustrated embodiment, the clamping device 3 is attached to a vertical base plate 6 forming part of the body of the termination structure. The termination structure 5 comprises a base frame 7, which is openly shaped downwards so as to allow the termination structure 5 to receive a pipeline end section 1b (see FIGS. 5-7) provided with a pipeline hub 1a by lowering the termination structure 5 downwards onto said pipeline end section. In the illustrated embodiment, the base frame 7 comprises two cantilever beams 8a, 8b extending from the plate 6 below and on either side of the clamping device 3. The cantilever beams are intended to extend essentially in parallel with a pipeline end section properly received in the termination structure. The clamping device 3 is preferably fixedly secured in relation to the base frame 7 so as to be displaceable together with the base frame 7 and the other parts of the termination structure 5.

The termination structure 5 comprises a guiding device 9 for engaging the pipeline end section when received in the termination structure so as to secure that the pipeline end section and the associated pipeline hub are properly received and positioned in the termination structure. In the illustrated embodiment, the guiding device consists of a yoke 9 having inverted U-shape with a downwardly directed opening for receiving a pipeline end section. The yoke 9 has its legs 9a, 9b secured to the outer ends of the cantilever beams 8a, 8b so as to bridge the gap between said beams. The pipeline end section is to enter the termination structure 5 via the open space between the cantilever beams 8a, 8b when the termination structure is lowered onto it. The bottom 9c of the yoke 9 is intended to come to bear against a pipeline end section received in the termination structure 5 so as to secure that the pipeline end section and the associated pipeline hub are positioned in front of the clamping device 3 in the space between the cantilever beams 8a, 8b and the yoke 9.

The guiding device 9 is preferably provided with releasable locking means 10 for locking a pipeline end section in relation to the termination structure 5 when received therein. The locking means 10 are suitably designed to engage with a sleeve member 1c (see FIGS. 5-7) arranged on the pipeline end section fixedly secured in relation to the pipeline hub 1a so as to thereby lock the pipeline end section 1b and the pipeline hub 1a in relation to the termination structure 5 in a predetermined axial position. In the illustrated embodiment, the locking means 10 comprise two pivotable locking arms 10a, 10b, which are pivotable into and out of engagement with said sleeve 1c and which are arranged at the bottom part 9c of the yoke 9.

The termination structure 5 illustrated in FIG. 1 is intended to cooperate with an alignment structure 20 designed to be connectable to a pipeline end section 1b received in the termination structure 5 by being lowered downwards onto said pipeline end section so as to come to bear against it. The alignment structure 20 is designed to receive, when it is lowered downwards onto the pipeline end section 1b, at least a part of a flange 1d (see FIGS. 5 and 6) of the pipeline end section received in the termination structure 5. Said flange 1d is fixedly secured in relation to the pipeline hub 1a and is preferably rotationally symmetric. In the illustrated embodiment, the alignment structure 20 is provided with a housing 21 of inverted U-shape with a downwardly directed opening for receiving said pipeline end section flange 1d. The alignment structure 20 comprises an alignment device 22 for properly aligning said flange 1d and thereby the pipeline hub 1a in relation to the alignment structure when received therein. The alignment device comprises at least one force applying member 22a for forcing a received pipeline end section flange 1d against an abutment 23 of the alignment structure. In the illustrated embodiment, said abutment is formed by a wall 23 of the housing 21. The alignment device preferably comprises at least three force applying members 22a spaced apart in the circumferential direction of a received pipeline end section flange 1d for forcing said flange against the abutment 23. In the illustrated embodiment, the respective force applying member 22a comprises a push member, which is displaceably mounted in the alignment structure 20 and is displaceable by means of a hydraulic cylinder 24 arranged in the alignment structure.

The alignment structure 20 and clamping device 3 are designed to be displaceable in relation to each other when the alignment structure has come to bear against a pipeline end section 1b received in the termination structure 5 so as to allow the pipeline hub 1a and the clamping device 3 to be mutually displaced into contact with each other. This will be more closely described below with reference to FIGS. 5-7. The termination structure 5 and alignment structure 20 are provided with corresponding alignment members 15, 25 which are designed to come into contact with each other when the alignment structure 20 and clamping device 3 are displaced towards each other so as to properly align the pipeline hub 1a in relation to the spool piece hub 2a. One of the alignment structure and termination structure is suitably provided with at least one male-like alignment member 25, preferably in the form of a spear, which is designed to fit into a corresponding female-like alignment member 15, preferably in the form of a spear funnel, arranged on the other of said structures. The respective male-like alignment member 25 is preferably displaceably mounted in the associated structure 20 so as to allow the alignment member 25 to be retracted out of the corresponding female-like alignment member 15 without having to displace the entire alignment structure 20 in relation to the termination structure 5. The respective male-like alignment member 25 is preferably displaceable by means of a hydraulic cylinder arranged in the associated structure. In the illustrated embodiment, the alignment structure is provided with two displaceably mounted alignment spears 25 arranged in the alignment structure 20 so as to be located below and on either side of the centre line of a pipeline end section 1b onto which the alignment structure 20 has been lowered. The respective spear 25 is displaceable by means of a hydraulic cylinder 28 arranged in the alignment structure 20. The termination structure 5 is here provided with two spear funnels 15 for receiving a respective one of the alignment spears 25. The spear funnels 15 are located on either side of the centre line of a spool piece hub 2a mounted to the termination structure 5. The respective spear funnel 15 is here attached to the vertical base plate 6 of the termination structure. The respective alignment member 25 of the alignment structure 20 is preferably designed to abut against the corresponding alignment member 15 of the termination structure 5 when the clamping device 3 has been displaced into contact with the pipeline hub so as to align the hub mating faces prior to their mutual contact for final alignment.

The alignment structure 20 is preferably also provided with at least two stop members 26, which are arranged in the alignment structure so as to be located above and on either side of the centre line of a pipeline end section onto which the alignment structure 20 has been lowered. The respective stop member 26 is designed to abut against a corresponding stop member 16 of the termination structure 5 when the clamping device 3 is displaced into contact with the pipeline hub 1a so as to reduce the angle between the hub mating faces. Hereby, the pipeline hub 1a will automatically be sufficiently aligned with the spool piece hub 2a to meet the closing capture range of the clamping device. In the illustrated embodiment, the alignment structure 20 and the termination structure 5 are each provided with two such stop members 26, 16 in addition to the corresponding function included in the alignment members 25, 15.

The termination structure 5 and the alignment structure 20 are provided with means for receiving a remotely operated connecting tool provided with force applying means, preferably in the form of hydraulic cylinders, for displacing the alignment structure 20 and the clamping device 3 in relation to each other. The clamping device 3 is preferably designed to be displaced in relation to the alignment structure 20 by being displaced together with the other parts of the termination structure 5 in relation to the alignment structure. In the illustrated embodiment, the alignment structure 20 and the termination structure 5 are each provided with slots 27, 17 for docketing of hydraulic cylinders of the connecting tool to said structures. The connecting tool may also be provided with torque applying device 32 preferably hydraulically operated, for actuating the clamping device 3 so as to clamp together the pipeline hub 1a and the spool piece hub 2a. Alternatively, the torque applying device may be installed separately. The alignment structure 20 could form part of the connecting tool or the connecting tool could, alternatively, be designed as a separate unit that is lowered downwards into engagement with the alignment structure 20 and the termination structure 5 after the positioning of the termination structure and the alignment structure onto a pipeline end section. The termination structure 5 is provided with guiding means 18 designed to co-operate with corresponding guiding means on the connecting tool so as to guide the connecting tool into a correct position in relation to the termination structure when the connecting tool is lowered downwards into engagement with the termination structure. In the illustrated embodiment, said guiding means of the termination structure 5 comprises two guide post receptacles 18 arranged in the termination structure 5 so as to be located on either side of the spool piece hub 2a. The respective guide post receptacle 18 is intended to receive a guide post, by means of which the connecting tool is guided into engagement with the termination structure 5.

Figure 5:
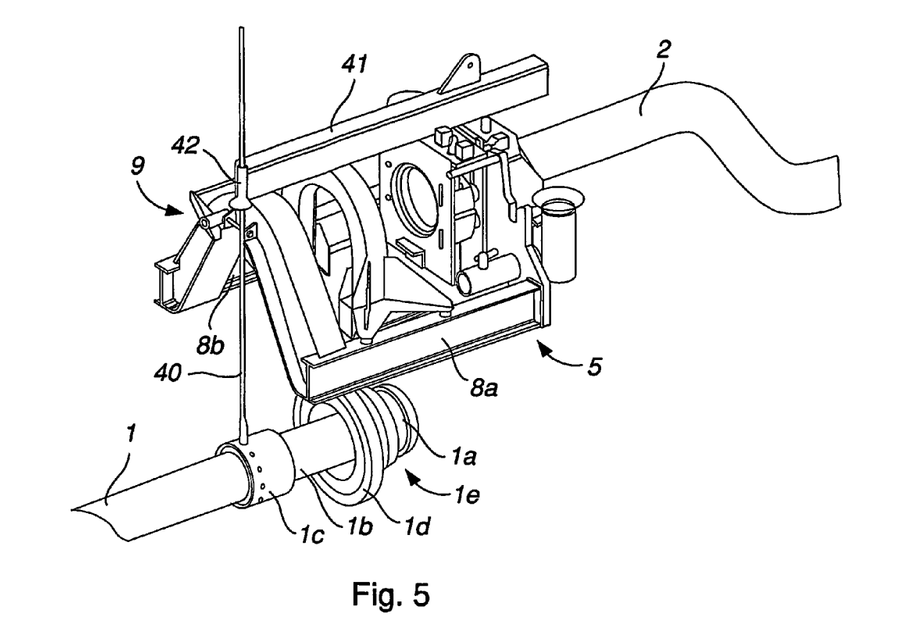
Figure 9:
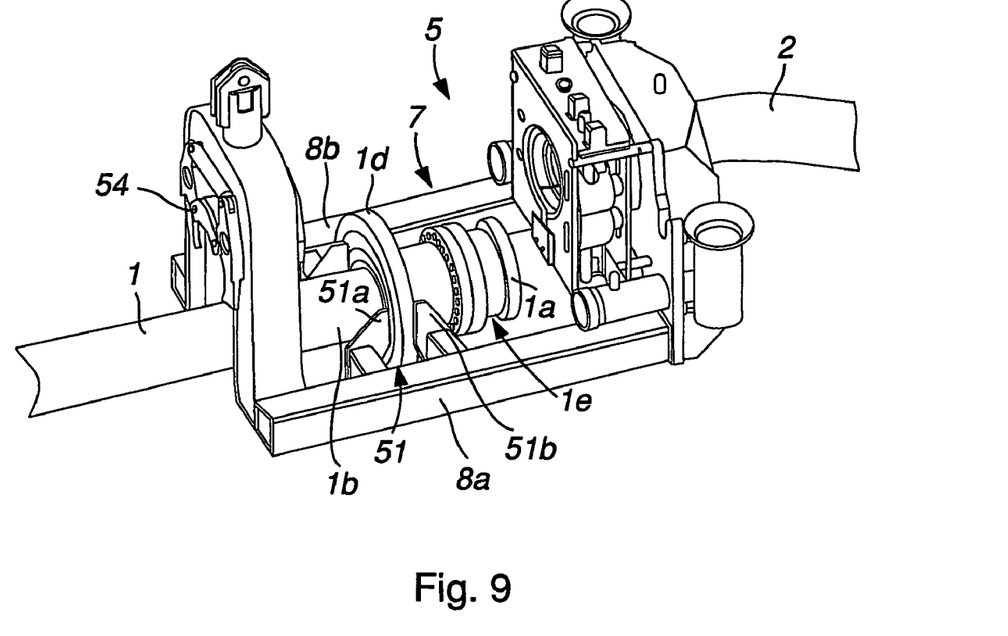
FIGS. 9-15 are schematical illustrations of different stages in a method for subsea connection of a pipeline to a spool piece by means of the termination structure of FIG. 8.

Pipeline terminations 1e according to the present invention are shown in FIG. 5 and FIG. 9. The respective pipeline termination 1e is to be applied to the end section 1b of a pipeline 1 so as to allow the pipeline 1 to be connected sub-sea to a spool piece 2. The pipeline termination 1e comprises a pipeline hub 1a designed for connection to a corresponding spool piece hub 2a. The pipeline termination 1e further comprises a flange 1d located behind the pipeline hub 1a and designed to constitute a reaction shoulder for use in the alignment and displacement of the pipeline termination 1e and the associated pipeline hub 1a in relation to said spool piece hub 2a, as described in closer detail below. Said flange 1d is fixedly secured in relation to the pipeline hub 1a and is preferably rotationally symmetric. The pipeline termination 1e is designed for co-operation with a connection arrangement according to the present invention.

Figure 6:
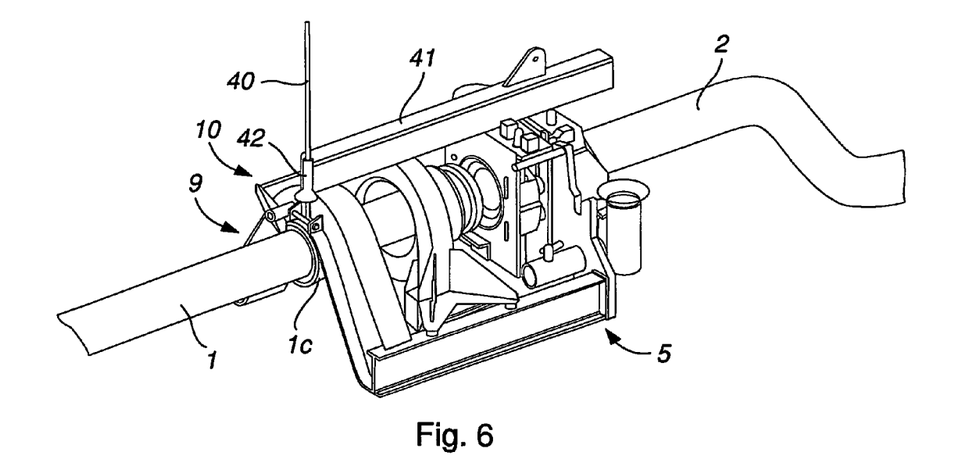
Figure 7:
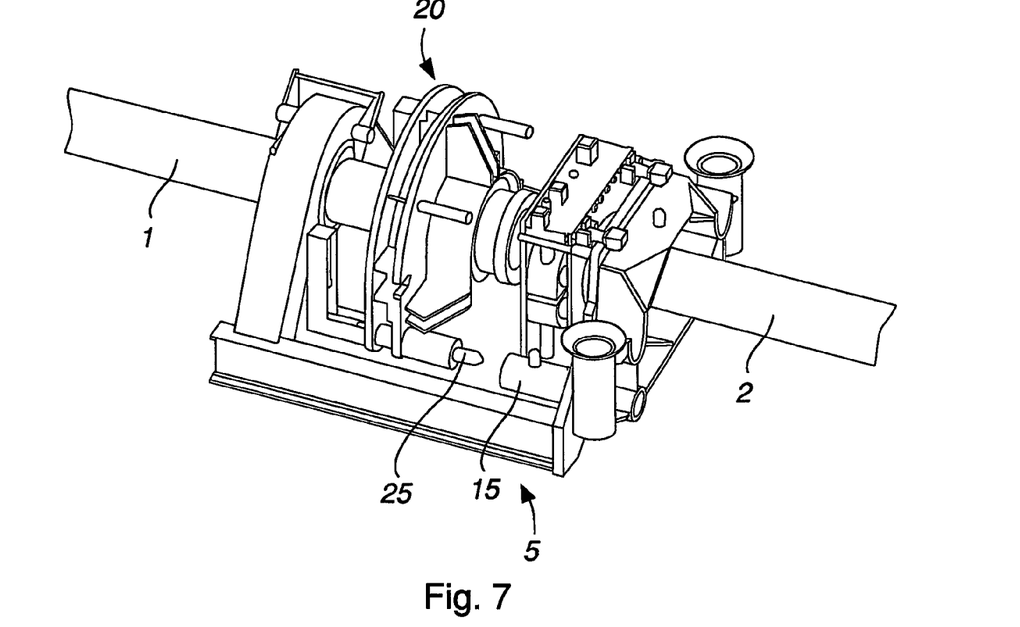

The operation of a connection arrangement comprising the above-described termination structure 5 and alignment structure 20 is schematically illustrated in FIGS. 5-7. The pipeline 1 provided with a pipeline hub 1a, a flange 1d and alternatively a sleeve member 1c at the end section 1b is initially laid on the seabed. The pipeline end section 1b is to be supported by a suitable support, such as a rock heap or a fabricated support structure, so as to make sure that the pipeline end section 1b is elevated from the seabed. Subsea metrology is then carried out between the pipeline hub 1a and the permanent subsea installation to which the pipeline is to be connected. The results of the subsea metrology are used to complete the geometry of the spool piece 2, which is mounted to the spool piece termination structure 5. A guide line 40 will in this option be connected to the sleeve member 1c of the pipeline. The termination structure 5 is attached to a lifting device 41 provided with a guide member 42. The guide member 42 of the lifting device 41 is connected to the guide line 40 and the lifting device 41 is together with the termination structure 5 and the associated spool piece 2 lowered into the sea, e.g. from a surface vessel, and guided towards the pipeline end section 1b, as illustrated in FIG. 5. The termination structure 5 and the lifting device 41 are lowered downwards until the pipeline end section 1b is received between the cantilever beams 8a, 8b and the guiding device 9 of the termination structure abuts against the sleeve member 1c, as illustrated in FIG. 6. The locking means 10 will align and lock the sleeve member 1c, and thereby the pipeline end section, axially in relation to the termination structure 5 in a preliminary parking position. The lifting device 41 is then disconnected from the termination structure 5 and retrieved to the surface. The alignment structure 20 is then lowered downwards, e.g. from said surface vessel, into engagement with the flange 1d of the pipeline end section together with a connecting tool (not shown), whereupon the alignment device 22 is actuated so as to properly align the pipeline end section flange 1d in relation to the alignment structure 20. Alternatively, the connecting tool may be lowered into contact with the alignment structure 20 and the termination structure 5 after the positioning of the alignment structure onto the pipeline end section. Thereafter, the connecting tool is actuated so as to displace the termination structure 5 and thereby the clamping device 3 towards the alignment structure 20. Before this displacement is carried out, the sleeve member 1c has been released from the locking means 10 so as to allow the termination structure 5 to slide along the pipeline 1. When the spool piece hub with the clamping device 3 has been displaced into engagement with the pipeline hub 1a, the torque applying device is made to actuate the clamping device 3 so as to clamp together the pipeline hub 1a and the spool piece hub 2a, whereupon the alignment spears 25 are withdrawn from the respective spear funnel 15 and the connecting tool and the alignment structure 20 are retrieved to the surface.

Figure 8:
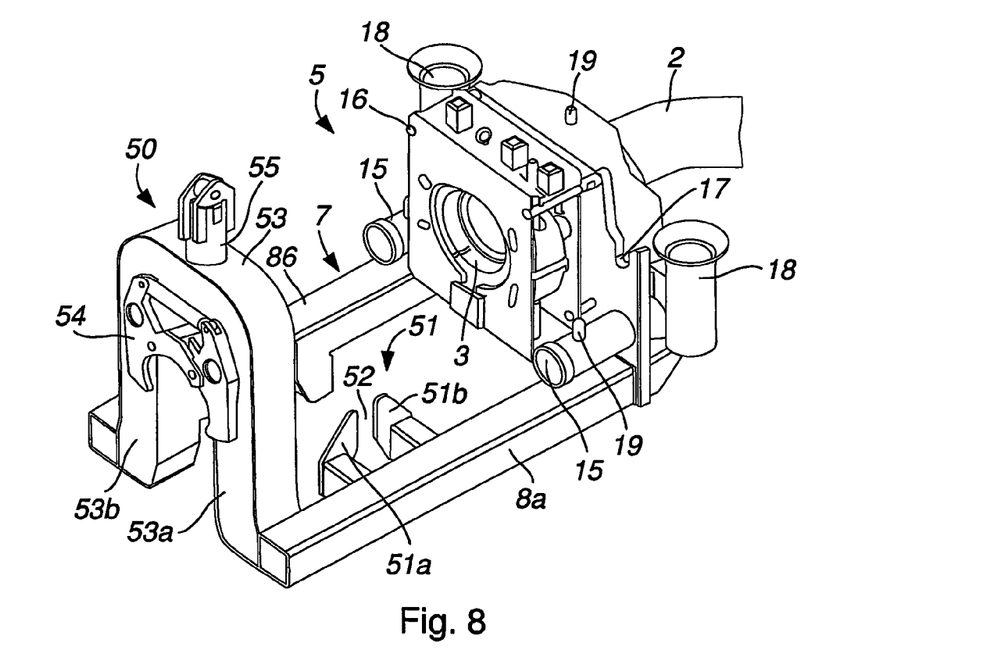
FIG. 8 is a perspective view of a spool piece termination structure according to a second embodiment of the invention.

An alternative embodiment of a spool piece termination structure 5 according to the invention is illustrated in FIG. 8.

Details of the termination structure 5 illustrated in FIG. 8 and other details of the connection arrangement illustrated in FIGS. 9-15 are in FIG. 8-15 indicated with the same reference signs as the corresponding details of the termination structure and connection arrangement illustrated in FIGS. 1-7.

The main difference between the termination structure 5 of FIG. 8 and the termination structure of FIG. 1 is that the termination structure of FIG. 8 is provided with a lifting appliance 50 for lifting a pipeline end section 1b (see FIGS. 9-11) received in the termination structure 5 upwards in relation to the base frame 7 in order to align the pipeline hub 1a with the clamping device 3 through an active and more controllable operation. Alternatively, the lifting appliance 50 could be a separately installed unit or included in the alignment structure 20 or the connecting tool 30. This will allow the pipeline end section 1b and the associated pipeline hub 1a to be positioned directly onto the seabed or onto a fabricated subsea foundation. Furthermore, in the termination structure 5 of FIG. 8, a guiding device 51 for engaging the pipeline end section 1b when received in the termination structure 5 so as to secure that the pipeline end section and the associated pipeline hub 1a are properly received and positioned in the termination structure 5 is designed to engage with the pipeline end section flange 1d. The guiding device 51 here comprises two pairs of guide plates 51a, 51b attached to the cantilever beams 8a, 8b. A slot 52 for receiving said flange 1d is provided between the two guide plates 51a, 51b of the respective guide plate pair. Said slot has a tapered, downwardly directed opening. The cantilever beams 8a, 8b will here constitute landing means for allowing the termination structure to rest on the seabed or on a fabricated subsea foundation. In the illustrated embodiment, the lifting appliance 50 is attached to a yoke 53 having inverted U-shape with a downwardly directed opening for receiving a pipeline end section. The yoke 53 has its legs 53a, 53b secured to the outer ends of the cantilever beams 8a, 8b so as to bridge the gap between said beams. The lifting appliance 50 comprises a gripping device 54, preferably hydraulically actuated, for gripping a pipeline end section 1b onto which the termination structure 5 has been lowered. The gripping device 54 is vertically moveable in relation to the base frame 7 of the termination structure 5, preferably by means of a hydraulic cylinder 55, so as to allow the gripping device 54 to be lowered into contact with a pipeline end section 1b that is received in the termination structure while still laying on the seabed or on a subsea foundation and allow the gripping device 54 to be raised together with a gripped pipeline end section 1b in relation to the base frame 7.

Figures 2, 3, 4:
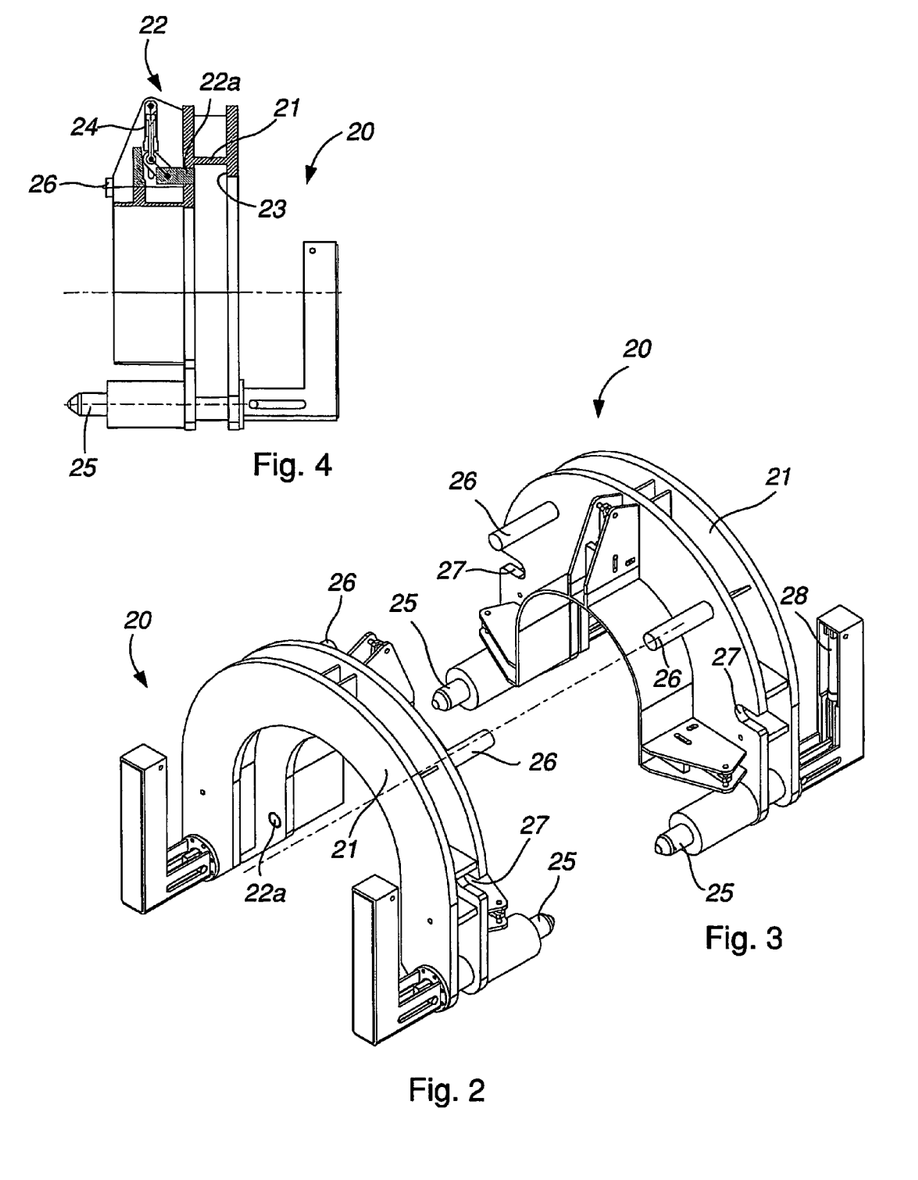
FIG. 2 is a perspective view of the rear section of an alignment structure intended for co-operation with the termination structure of FIG. 1.
FIG. 3 is a perspective view of the alignment structure of FIG. 2, as seen from the opposite direction.
FIG. 4 is a vertical cross section through the centre of the alignment structure of FIGS. 2 and 3, FIG. 5-7 are schematical illustrations of different stages in a method for subsea connection of a pipeline to a spool piece by means of the termination structure of FIG. 1 and the alignment structure of FIGS. 2-4.
Figure 10:
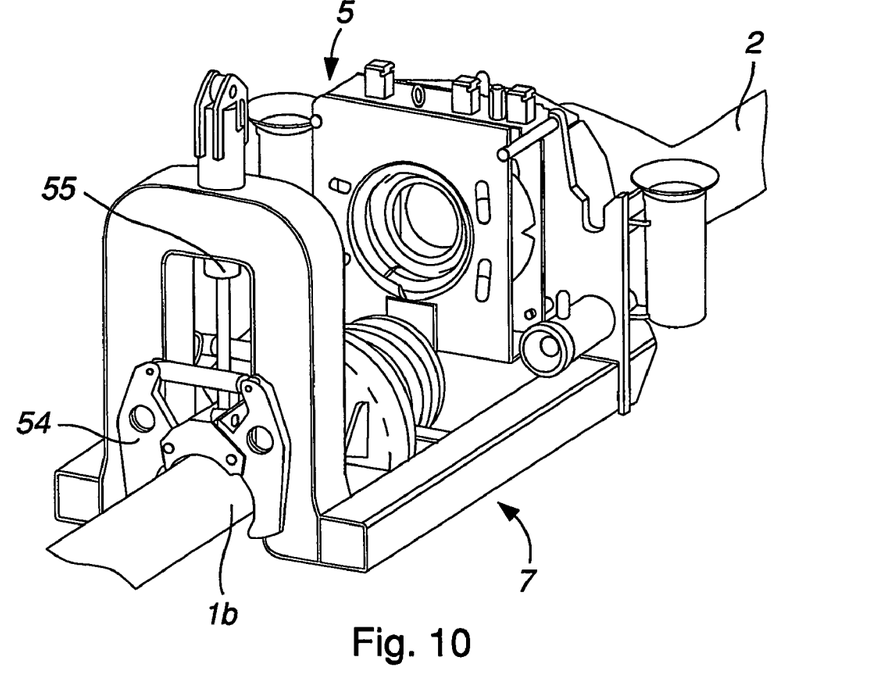
Figure 11:
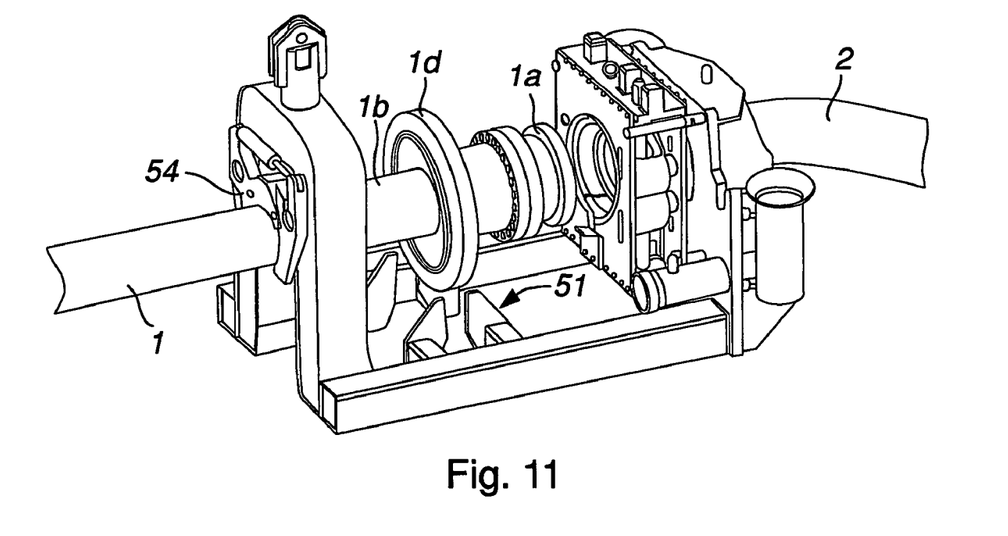
Figures 12, 13:
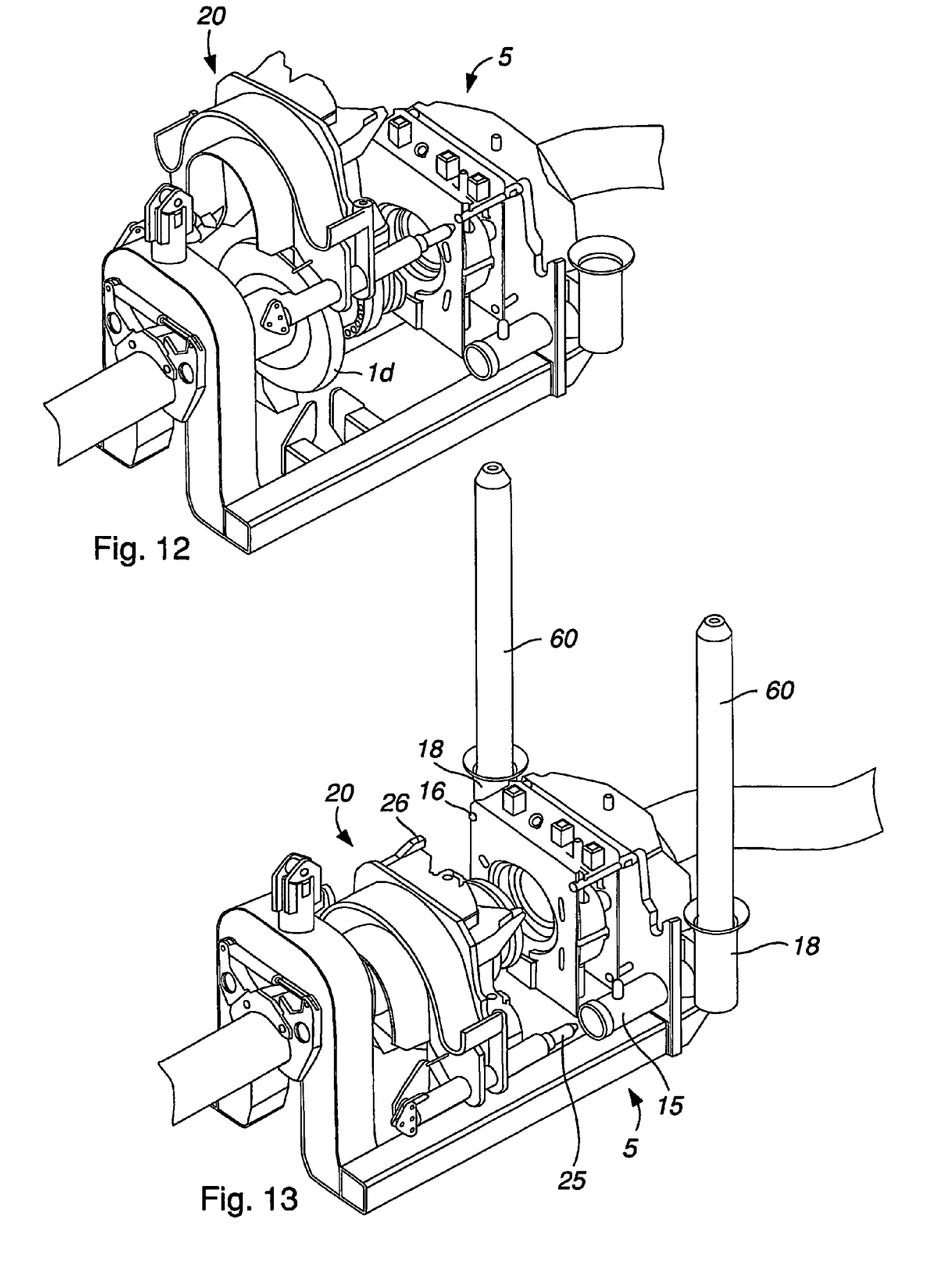
Figure 14:
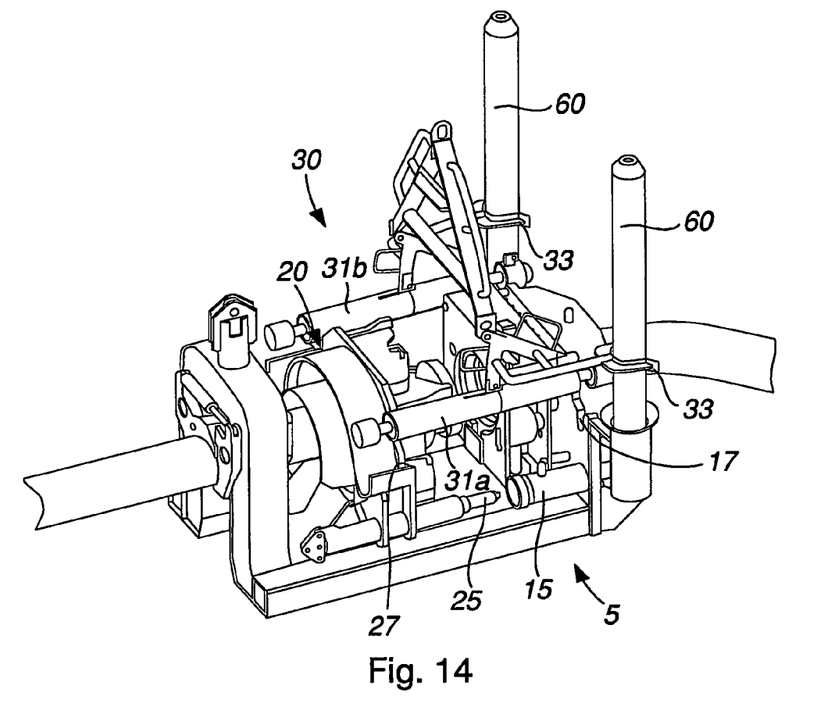
Figure 15:
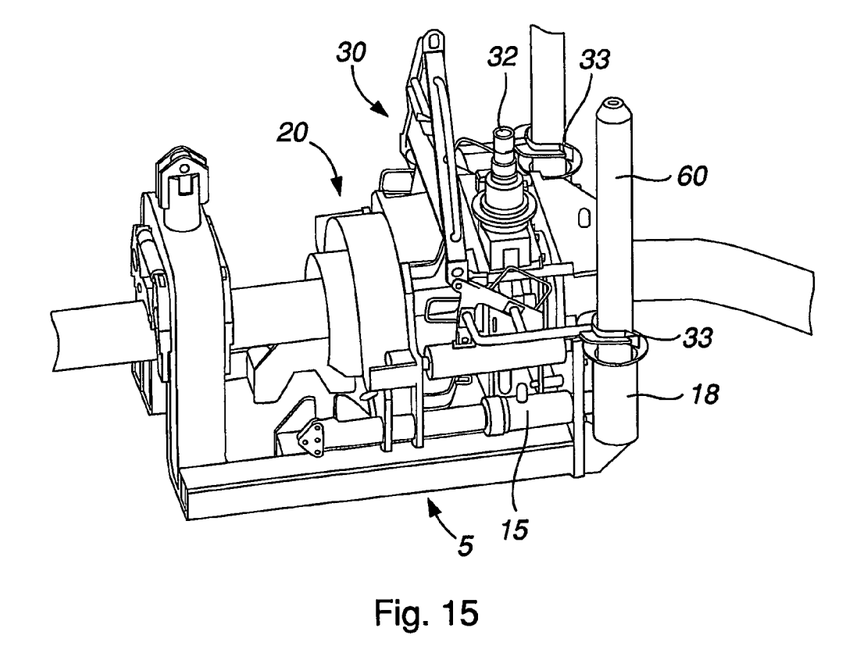

The operation of a connection arrangement comprising a spool piece termination structure 5 according to FIG. 8 is schematically illustrated in FIGS. 9-15. The pipeline 1 provided with a pipeline hub 1a and a flange 1d at the end section 1b is initially laid on the seabed. The pipeline end section 1b is laid directly on the seabed or on a fabricated subsea foundation, i.e. it does not have to be elevated from the seabed/foundation. Subsea metrology is then carried out between the pipeline hub 1a and the permanent subsea installation to which the pipeline is to be connected. The results of the subsea metrology are used to complete the geometry of the spool piece 2, which is mounted to the spool piece termination structure 5. The termination structure 5 is together with the associated spool piece 2 lowered into the sea, e.g. by means of slings attached to the spool piece from a surface vessel, and it is lowered downwards onto the pipeline end section 1b so as to come to bear against the seabed/foundation. A guide line attached to a suitable location on the pipeline end section will assist the guiding to ensure capture of the cantilever beams 8a, 8b and guide plates 51a, 51b of the termination structure 5 over the flange 1d, as illustrated in FIG. 9. The gripping device 54 is then lowered downwards in relation to the base frame 7 into engagement with the pipeline end section 1b, as illustrated in FIG. 10, whereupon the gripping device is made to grip the pipeline end section 1b. The gripping device 54 is then raised upwards in relation to the base frame 7, while carrying the pipeline end section 1b, so as to align the pipeline hub 1a with the clamping device 3 and release the pipeline end section flange 1d from the guiding device 51, as illustrated in FIG. 11. An alignment structure 20 of the above-indicated type is then lowered downwards into engagement with the pipeline end section flange 1d, as illustrated in FIG. 12, whereupon an alignment device of the alignment structure, e.g. of the type described with reference to FIG. 2-4, is actuated so as to properly align the pipeline end section flange 1d in relation to the alignment structure 20. A connecting tool 30 comprising a pair of stroking cylinders 31a, 31b is then lowered downwards into contact with the alignment structure 20 and the termination structure 5. The alignment structure 20 and the connecting tool 30 may both be guided into position by means of guide posts 60 inserted into the guide post receptacles 18 of the termination structure 5, as illustrated in FIGS. 13 and 14. The stroking cylinders 31a, 31b are connected to the alignment structure 20 and the termination structure 5 via docketing slots 27, 17 arranged in said structures. The stroking cylinders 31a, 31b are then actuated so as to displace the termination structure 5 and thereby the clamping device 3 towards the alignment structure 20, as illustrated in FIG. 15. When the displacement operation is completed, a torque applying device 32 is made to actuate the clamping device 3 so as to clamp together the pipeline hub 1a and the spool piece hub 2a, whereupon a pressure test is performed to verify the sealing integrity. The alignment spears 25 are withdrawn from the respective spear funnel 15 and the connecting tool 30 and the alignment structure 20 are retrieved to the surface together with the lifting appliance 50 if configured as a separate unit.

The torque applying device 32 may be included in the connecting tool 30 or constitute a separate unit that is moveable into contact with the termination structure separately from the connecting tool 30.

The connecting tool 30 is provided with guiding means 33 designed to engage with the guide posts 60 as the connecting tool is lowered downwards into contact with the termination structure 5.

The alignment structure 20 illustrated in FIGS. 12-15 has a somewhat modified design as compared to the alignment structure of FIGS. 2-4. However, it comprises the same type of alignment device 22, alignment members 25 and stop members 26 as the alignment structure of FIGS. 2-4.

The invention is of course not in any way restricted to the preferred embodiments described above. On the contrary, many possibilities to modifications thereof will be apparent to a person with ordinary skill in the art without departing from the basic idea of the invention such as defined in the appended claims.

The invention claimed is:

1. A connection arrangement for subsea connection of a pipeline to a spool piece by clamping together a pipeline hub secured to an end section of the pipeline and a spool piece hub secured to an end section of the spool piece, the connection arrangement comprising:
    a spool piece termination structure comprising a clamping device for clamping together said spool piece hub and pipeline hub, and a base frame openly shaped downwards so as to allow the termination structure to receive a pipeline end section provided with said pipeline hub by lowering the termination structure downwards onto said pipeline end section;
    an alignment structure designed to be connectable to a pipeline end section received in the termination structure by being lowered downwards onto said pipeline end section so as to come to bear against it, the alignment structure being designed to receive, when it is lowered downwards onto said pipeline end section, at least a part of a flange of the pipeline end section, the alignment structure comprising an alignment device for properly aligning said flange and thereby the pipeline hub in relation to the alignment structure when received therein; and
    wherein the alignment structure and clamping device are designed to be displaceable in relation to each other when the alignment structure has come to bear against said pipeline end section and the pipeline end section flange has been received in the alignment structure so as to allow the pipeline hub and the spool piece hub to be mutually displaced into contact with each other.

2. The connection arrangement according to claim 1, wherein the spool piece termination structure further comprises a guiding device for engaging the pipeline end section when received in the termination structure so as to ensure that the pipeline end section and the associated pipeline hub are properly received and positioned in the termination structure.

3. The connection arrangement according to claim 1, wherein the spool piece termination structure further comprises landing means designed to allow the termination structure to rest on the seabed or on a fabricated subsea foundation.

4. The connection arrangement according to claim 1, wherein the spool piece termination structure further comprises a lifting appliance for lifting a pipeline end section received in the termination structure upwards in relation to the base frame.

5. The connection arrangement according to claim 1, wherein the clamping device is fixedly secured in relation to the base frame so as to be displaceable together with the base frame.

6. The connection arrangement according to claim 1, wherein the alignment structure is designed to receive at least a part of a rotationally symmetric flange of a pipeline end section.

7. The connection arrangement according to claim 1, wherein the termination structure and alignment structure comprise corresponding alignment members which are designed to allow contact with each other when the alignment structure and the clamping device are displaced towards each other for the purpose of alignment of the alignment structure in relation to the clamping device.

8. The connection arrangement according to claim 7, wherein one of the alignment structure and termination structure comprises at least one male-like alignment member, preferably in the form of a spear, which is designed to fit into a corresponding female-like alignment member, preferably in the form of a spear funnel, arranged on the other of said structures.

9. The connection arrangement according to claim 8, wherein the respective male-like alignment member is displaceably mounted in the associated structure so as to allow the alignment member to be retracted out of the corresponding female-like alignment member without having to displace the entire alignment structure in relation to the termination structure.

10. The connection arrangement according to claim 9, wherein the respective male-like alignment member is displaceable by means of a hydraulic cylinder arranged in the associated structure.

11. The connection arrangement according to claim 7, wherein the alignment structure comprises at least two alignment members, which are arranged in the alignment structure so as to be located below and on either side of the center line of a pipeline end section onto which the alignment structure has been lowered.

12. The connection arrangement according to claim 11, wherein the alignment structure comprises at least two stop members, which are arranged in the alignment structure so as to be located above and on either side of the center line of a pipeline end section onto which the alignment structure has been lowered, the respective stop member being designed to abut against a corresponding stop member of the termination structure in the purpose of aligning the hub mating faces at displacement prior to their mutual contact for final alignment.

13. The connection arrangement according to claim 7, wherein the respective alignment member of the alignment structure is designed to abut against the corresponding alignment member of the termination structure for the purpose of aligning the hub mating faces at displacement prior to their mutual contact for final alignment.

14. The connection arrangement according to claim 1, wherein the alignment device of the alignment structure comprises at least one force applying member for forcing a received pipeline end section flange against an abutment of the alignment structure.

15. The connection arrangement according to claim 14, wherein the alignment device of the alignment structure comprises at least three force applying members spaced apart in the circumferential direction of a received pipeline end section flange for forcing said pipeline end section flange against said abutment.

16. The connection arrangement according to claim 1, wherein the termination structure is designed to receive a remotely operated connecting tool comprising force applying means for displacing the clamping device and the alignment structure in relation to each other.

17. The connection arrangement according to claim 16, wherein the termination structure further comprises guiding means designed to co-operate with corresponding guiding means on the connecting tool so as to guide the connecting tool into a correct position in relation to the termination structure when the connecting tool is lowered downwards into contact with the termination structure.

18. The connection arrangement according to claim 1, wherein the clamping device is displaceable in relation to the alignment structure by being displaceable together with the other parts of the termination structure in relation to the alignment structure.

19. A method for subsea connection of a pipeline to a spool piece by clamping together a pipeline hub secured to an end section of the pipeline and a spool piece hub secured to an end section of the spool piece, the method comprising:
- mounting a spool piece hub on a spool piece termination structure comprising a clamping device,
- receiving with the spool piece termination structure the pipeline end section and the associated pipeline hub by lowering the termination structure downwards onto said pipeline end section,
- connecting an alignment structure to the pipeline end section received in the termination structure by lowering the alignment structure downwards onto said pipeline end section so as to come to bear against the pipeline end section,
- receiving with the alignment structure at least a part of a flange of the pipeline end section received in the termination structure when the alignment structure is lowered downwards onto the pipeline end section,
- arranging an alignment device in the alignment structure,
- activating the alignment device so as to properly align said flange and thereby the pipeline hub in relation to the alignment structure,
- displacing the alignment structure and the clamping device towards each other so as to bring the pipeline hub and the spool piece hub with the clamping device into contact with each other,
- activating the clamping device so as to clamp together the pipeline hub and the spool piece hub.

20. The method according to claim 19, further comprising:
- receiving with the alignment structure at least a part of a rotationally symmetric flange of the pipeline end section.

21. The method according to claim 19, further comprising:
- bringing into contact with each other corresponding alignment members of the termination structure and the alignment structure when the clamping device and the alignment structure are displaced towards each other so as to properly align the pipeline hub in relation to the spool piece hub.

22. The method according to claim 19, further comprising:
- displacing the alignment structure and clamping device in relation to each other by means of a remotely operated connecting tool provided with force applying means for displacing the clamping device and the alignment structure towards each other.

23. The method according to claim 19, further comprising:
- bringing the pipeline hub and the clamping device into position to each other by displacing the clamping device together with the other parts of the termination structure in relation to the pipeline hub.

\* \* \* \* \*